United States Patent [19]

Lovell et al.

[11] 4,295,513
[45] Oct. 20, 1981

[54] TIRE AND METHOD OF REINFORCEMENT

[75] Inventors: John A. Lovell, Munroe Falls; Kenneth W. McIntosh, Cuyahoga Falls, both of Ohio

[73] Assignee: The Goodyear Tire & Rubber Company, Akron, Ohio

[21] Appl. No.: 139,411

[22] Filed: Apr. 11, 1980

[51] Int. Cl.³ .............................................. B60C 9/02
[52] U.S. Cl. .................................. 152/358; 156/125; 264/501; 264/275; 264/326
[58] Field of Search .......... 152/330 R, 354 R, 357 R, 152/358, 361; 264/501, 250, 257, 258, 261, 262, 271, 275, 326; 156/123 R, 125 R, 133, 128 P

[56] References Cited

U.S. PATENT DOCUMENTS

| | | | |
|---|---|---|---|
| 3,183,135 | 5/1965 | Berquist | 156/126 |
| 3,315,283 | 4/1967 | Larsen | 428/255 |
| 3,458,373 | 7/1969 | Knipp et al. | 156/125 |
| 3,677,318 | 7/1972 | Glass et al. | 152/356 |
| 3,701,374 | 10/1972 | McGillvary | 152/330 R |
| 3,888,291 | 6/1975 | Herzlich et al. | 152/330 R |
| 3,956,448 | 5/1976 | Larson | 264/138 |
| 3,975,490 | 8/1976 | Lapeyre | 264/271 |
| 4,049,767 | 9/1977 | Vaidya | 264/257 |

OTHER PUBLICATIONS

"Fairchild's Dictionary of Textiles" edited by Wingate, Fairchild Publications, New York, N.Y., p. 129.
"Wellington Sears Handbook of Industrial Textiles" by Kaswell, Pub. by Wellington Sears Co., New York, N.Y., 1963, pp. 109, 198, 199-201.

Primary Examiner—John E. Kittle
Attorney, Agent, or Firm—Frederick K. Lacher; H. C. Young, Jr.

[57] ABSTRACT

A tire having a reinforcing sheet of tubular knit material stretchable during shaping into a toroidal form. The knit material provides openings for striking through of the liquid reaction mixture of elastomer forming material used in molding the tire. The sheet of knit material may be folded over spaced-apart bead rings and overlapped to provide multiple layers. The tire is molded on a core supporting the reinforcing sheet and bead rings with the strands of the knit material straightened out and in tension at the time of cure.

17 Claims, 4 Drawing Figures

TIRE AND METHOD OF REINFORCEMENT

This invention relates generally to fabric reinforcement of tires of elastomeric material and especially to reinforcement of tires made by pouring or injection of a liquid elastomer forming material into a mold. It has been the practice to apply fabric reinforcement to tires so that the fabric plies will be positioned for reinforcing the tire after the tire is cured. The strands of the fabric plies are generally not stretched appreciably during the making of the tire and the initial stretch of the strands takes place upon inflation of the tire and application of the load. During the initial stretch of the strands, the elastomeric material making up the body of the tire is only partially reinforced and must be stretchable to accommodate the stretching of the reinforcing strands. This additional stress limits the overall durability and strength of the tire.

It has also been the practice in making tires to apply the elastomeric material to plies of closely spaced tire cords. This has required the application of substantial pressure to force the material between the cords as by calendering. The movement of the elastomeric material through the plies has not been facilitated during shaping since the cords of the plies are pantographed and remain in the closely spaced condition.

In tires of the type made by pouring or injection of a liquid elastomer forming material into a mold, there has been an additional problem in maintaining the fabric in a desired position while the liquid elastomer forming material is injected into the mold. The fabric tends to flow with the injected material and has been transported out of position unless adequate provisions were made to hold the fabric in place. In some applications, the reinforcement is chopped fiberglass mixed in the liquid elastomer forming material and injected into the mold. Here again, there is a problem of positioning the chopped fibers which during transporting within the mold are difficult to space evenly. Furthermore, the chopped fiberglass fibers are oriented in the direction of material flow which is difficult to control and this may result in disorientation of the fibers and uneven reinforcement evidenced by unbalanced operation of the tire.

The present invention is directed to a tire construction in which the cords or strands of the fabric reinforcement are prestretched and therefore are in tension at the time the tire is cured and after being cured. This results in a tire having enhanced strength and durability. The invention is also directed to a tire construction in which there will be minimal, if any, transporting of the strands during injection of a liquid elastomer forming material into the mold.

In accordance with one aspect of the invention, there is provided a tire comprising an annular body of elastomeric material having a U-shaped cross section, an annular reinforcing sheet of tubular knit material stretchable into a toroidal configuration for placement in a mold and said reinforcing sheet being under tension in a molded and cured tire.

In accordance with another aspect of the invention, there is provided a process for making a tire having an annular body of elastomeric material with a U-shaped cross section and an annular reinforcing sheet of tubular knit material with a plurality of openings comprising the steps of:

(1) shaping said sheet from a generally cylindrical configuration to a generally toroidal configuration for positioning on a collapsible core;

(2) placing said sheet and core within a mold and closing an outer shell of said mold around said core;

(3) filling the cavity between said core and said outer shell by injecting a liquid reaction mixture of elastomer forming material and flowing said mixture through said openings in said knit material, reacting said mixture, and at least partially curing said mixture;

(4) opening said outer shell of said mold for removal of said tire and core from said mold;

(5) finally curing said tire; and (6) removing said collapsible core from said tire.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

Figure 1:
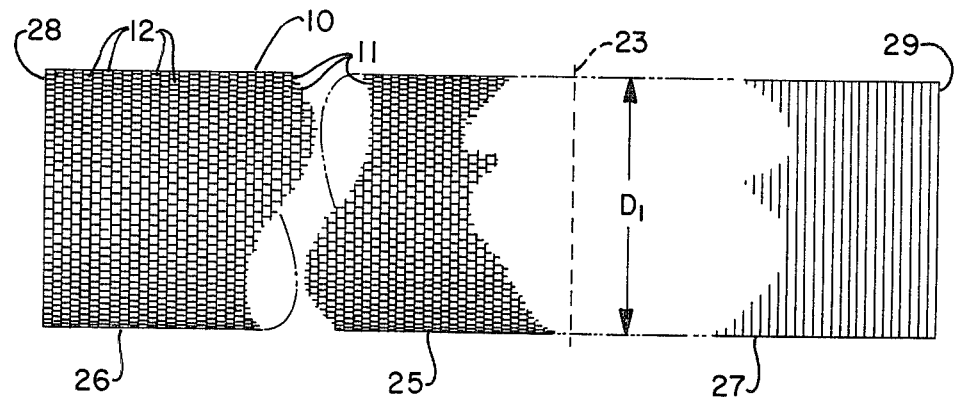
FIG. 1 is a schematic plan view of an annular reinforcing sheet of tubular knit material with parts being broken away.

Referring to FIG. 1, an annular reinforcing sheet 10 is shown in the cylindrical condition in which cords or strands 11 are knit together in a single knit, tubular construction. As shown, the knitted construction of the sheet 10 results in a fabric having sinuous strands 11 which are interlaced to provide a plurality of openings 12 between the strands. Preferably, the strands 11 of the reinforcing sheet 10 are of a textile polyester having a high modulus of elasticity; however, other suitable substantially nonstretchable materials such as aramid, wire, nylon, rayon, or dacron may be used. The reinforcing sheet 10 for this embodiment is knit so as to have a diameter D1 of 8 inches in the cylindrical unstretched condition.

Figure 2:
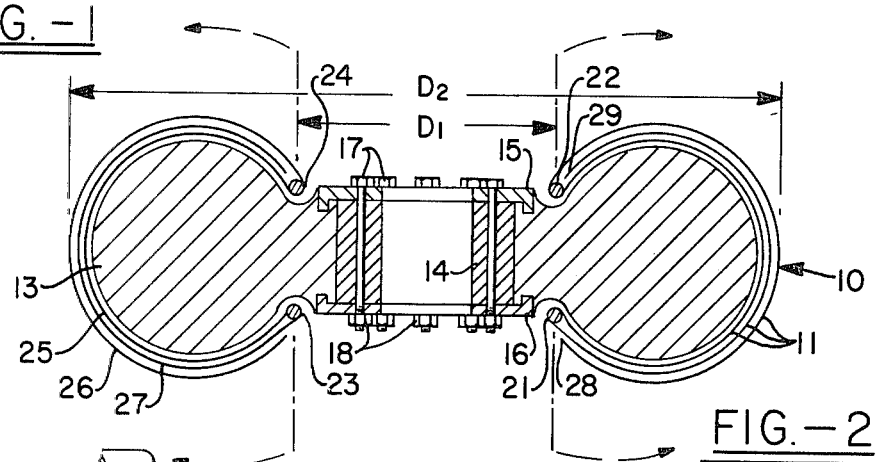
FIG. 2 is a sectional view along a radial plane of an annular collapsible core showing the annular reinforcing sheet of tubular knit material wrapped around the core and folded over the bead rings to provide three layers of reinforcing fabric.

Referring to FIG. 2, a collapsible annular core 13 is shown in the assembled condition with a plurality of segments mounted on a cylindrical ring 14 and clamped in position by flanges 15 and 16 fastened to the ring by a plurality of bolts 17 extending through the flanges and ring at spaced-apart positions circumferentially of the ring. Nuts 18 are threaded on the bolts 17 for urging the flanges 15 and 16 into clamping engagement with the ring 14 and core 13. In accordance with design practices well known in the mold art, the core 13 may have a plurality of segments arranged so that upon removal of the ring 14 and flanges 15 and 16, the core may be disassembled and pulled out of a tire surrounding the core.

As shown in FIG. 2, the reinforcing sheet 10 has been pulled over the core 13 by stretching of the knit fabric from the unstretched condition with a diameter D1 to a condition where the sheet is stretched up to 90 percent of the maximum elongation with a diameter D2 or approximately 16 inches (40.6 centimeters) in this embodiment.

Bead rings 21 and 22 having a diameter approximately the same as the diameter D1 of the reinforcing sheet 10 in the unstretched condition are positioned over the end portions of the sheet and adjacent the core 13 as shown in FIG. 2. The bead rings 21 and 22 are preferably of a substantially inextensible material such as wire and are located at spaced bead positions 23 and 24 dividing the reinforcing sheet into a central portion 25 and end portions 26 and 27 having substantially the same length as the central portion.

After mounting the bead rings 21 and 22 over the reinforcing sheet 10 at the bead positions 23 and 24, the end portions 26 and 27 are folded over the bead rings and stretched over the core 13 in the directions indicated by the arrows in FIG. 2. In this way the fabric of the reinforcing sheet 10 in the end portions 26 and 27 is also stretched up to 90 percent of maximum elongation of the sheet and the reinforcing sheet 10 placed in tension in the end portions. During stretching of the sheet 10 the strands 11 are straightened and placed in tension. Edges 28 and 29 of the reinforcing sheet 10 lay close to the adjacent portions of the reinforcing sheet in the folded condition, as shown in FIG. 2, and no adhesive or other fastening means are required to hold the edges in place.

Figure 3:
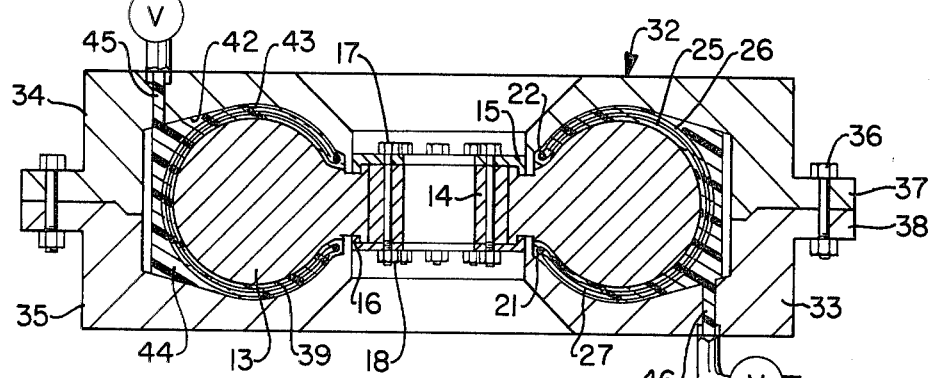
FIG. 3 is a cross sectional view of the annular collapsible core mounted in an annular twopiece mold showing the molded condition of the tire having an annular U-shaped cross section.

Referring to FIG. 3, an annular rigid mold 32 is shown which may be adapted for injection molding. The collapsible core 13 carrying the reinforcing sheet 10 folded around the bead rings 21 and 22 with the end portions 26 and 27 in overlapping relation to the central portion 25 of the reinforcing sheet is mounted in the mold 32. The mold 32 also has an outer shell 33 including two mold sections 34 and 35 held together by bolts and nuts 36 extending through flanges 37 and 38 of the mold sections 34 and 35, respectively, at circumferentially spaced positions around the mold.

Between an outer surface 39 of the core 13 and an inner molding surface 42 of the outer shell 33 is provided a cavity 43 for receiving a liquid reaction elastomer forming material to form a tire 44 shown in the molded condition. An inlet opening 45 is provided in mold section 34 and an outlet opening 46 is provided in the other mold section 35 at a position spaced from the inlet opening. The liquid reaction elastomer forming material may be injected through the inlet opening 45 and the mold vented through the outlet opening 46.

The tire 44 may be made by a suitable molding method such as injection molding a liquid reaction mixture and curing it to form a suitable polyurethane composition having a hardness in the range of from 60 Shore A to 50 Shore D and preferably of about 60 Shore A to 100 Shore A. Such polyurethane can be prepared by methods well known to those having skill in the art such as, for example, by forming a liquid reaction mixture of and reacting (A) a polymeric polyol, such as a polyester polyol or polyether polyol, having a molecular weight in the range of about 700 to about 10,000 and an average hydroxyl group functionality in the range of about 2 to about 2.3, (B) a slight stoichiometric excess of organic polyisocyanate having an average isocyanate (NCO) functionality in the range of about 2 to 2.3, and (C) chain extending or curing with a diamine or monomeric polyol containing an average of 2 to 2.3 hydroxyl groups. Generally, the polyurethane can be formed by any of the well known prepolymer, quasi-prepolymer or one-shot methods. Usually the prepolymer or quasi-prepolymer method is preferred in which a product of reacting (A) and (B) is mixed with a curative (C) to form a reaction mixture.

After injection into the cavity 43, the mixture forming the tire 44 is maintained at an elevated temperature of about 250° F. (121° C.) for a period of a few minutes to several hours to at least partially cure the tire.

During injection, the liquid reaction mixture flows or strikes through the openings 12 in the reinforcing sheet 10 wetting and completely surrounding the strands 11 so that in the molded condition the strands are encapsulated. The mixture also flows into the interstices in the strands 11 and is adhered thereto providing a bond between the reinforcing sheet 10 and the molded elastomeric material. Furthermore, the liquid reaction mixture flows into the cavity and through the openings 12 without transporting the sheet 10 or disorienting the strands 11 from the position they are laid in, as shown in FIG. 2.

It may be desirable to remove the tire 44 from the mold 32 and place it in a heated curing chamber (not shown) before it is completely cured. In that event the mold configuration is such that the mold sections 34 and 35 can be removed without damaging the tire. The tire 44 is then contained in the curing chamber at substantially the same curing temperatures for a period of time from a few minutes to several hours until the tire is completely cured. The tire 44 is then removed from the curing chamber and cooled to room temperature. The elastomeric material formed in the inlet opening 45 and outlet opening 46 may then be cut off.

The core 13 which is segmented may be removed from the tire after removal from the mold 32. The core 13 may then be reassembled on the ring 14 so that another reinforcing sheet 10 may be assembled with beads 21 and 22 on the core prior to placing in the mold 32.

Figure 4:
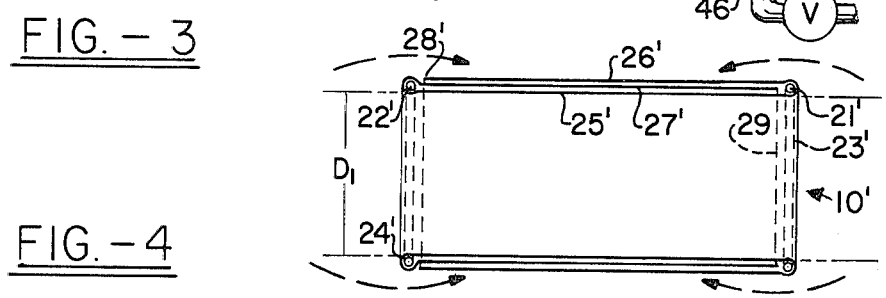
FIG. 4 is a schematic view of another modification in which the annular reinforcing sheet of tubular knit material is placed on a cylindrical drum and the ends folded over bead rings positioned around the reinforcing sheet.

Referring to FIG. 4, a schematic view is shown of a modification of the invention in which the reinforcing sheet 10' is pulled or placed over a generally cylindrical tire building drum 47, shown in chain-dotted lines. The bead rings 21' and 22' are placed over the drum 47 at spaced positions 23' and 24' dividing the reinforcing sheet 10' into a central portion 25' and end portions 26' and 27' having substantially the same length as the central portion. After mounting the bead rings 21' and 22' over the reinforcing sheet 10' at the positions 23' and 24', the end portions 26' and 27' are folded over the bead rings in the directions indicated by the arrows in FIG. 4. The edges 28' and 29' of the reinforcing sheet 10' are in close proximity to the beads 21' and 22' and are preferably fastened to the adjacent portions of the reinforcing sheet by suitable means such as adhesive to hold the edges in place.

The assembled reinforcing sheet 10' and bead rings 21' and 22' are then removed from the cylindrical drum 47 and placed on a suitable shaping apparatus for shaping the assembly from the cylindrical shape to a toroidal shape where the diameter of the reinforcing sheet 10' is increased from the diameter D1 in the unstretched condition to the diameter D2 in the stretched condition. During the shaping process the strands 11' are straightened and placed in tension. The core 13 may then be inserted in the assembly, as shown in FIG. 2, and the core placed in the mold 32, as shown in FIG. 3, for injection molding and curing of the tire 44 in a manner similar to that described hereinabove.

In the description of this invention, polyurethanes are described and indeed preferred. Such chemistry is generally known to those having skill in the art. Generally the polyurethane precursors are provided as a liquid reaction mixture which is cast and cured in the mold. The liquid reaction mixture is generally of the conventional prepolymer, quasiprepolymer or one-shot method. Ingredients for the polyurethanes are conventionally polymeric polyols, polyisocyanates and a diamine or monomeric polyol, usually a diol, curative. A small amount of organic solvent is used, as necessary, as a carrier; however, for this invention, it is preferred that the solvent is not used at all. The polymeric polyols are typically polyester or polyether polyols having a molecular weight in the range of about 700 to about 10,000.

In the practice of this invention, it is preferred that the polymeric polyol have a hydroxyl functionality of about 2 in order to enhance the elastomeric characteristic of the polyurethane. The polyurethane is prepared with a slight excess of isocyanate so that the diamine or diol, preferably a diamine curative can react therewith to perform the necessary crosslink or extension.

Injection and pouring of the liquid elastomer forming material has been described hereinabove. It is understood this includes other charging methods where the mold is charged with a measured amount of material under pressure or by gravity flow.

In the above embodiments the strands 11 and 11' have been of a substantially nonstretchable material and the stretchability of the sheet 10 has been generally the result of the knit construction in which the strands have been straightened during the stretching process. It is also contemplated that the strands 11 and 11' may be of a material which is stretchable; however, preferably the amount of stretch of the strands will be limited so as to provide the prestretching and tension of the strands prior to curing of the tire.

While certain representative embodiments and details have been shown for the purpose of illustrating the invention, it will be apparent to those skilled in the art that various changes and modifications may be made therein without departing from the spirit or scope of the invention.

I claim:

1. A tire comprising an annular body of elastomeric material having a U-shaped cross section, an annular reinforcing sheet of tubular knit material stretchable into a toroidal configuration for placement in a mold and said reinforcing sheet being under tension in a molded and cured tire.

2. A tire according to claim 1 wherein said knit material has openings in said sheet for striking through of a liquid reaction mixture of elastomer forming material to provide encapsulation of said knit material and interlocking with said annular body.

3. A tire according to claim 1 wherein a pair of annular bead portions are located at the radially inner edges of said body, a pair of bead rings are positioned in said bead portions and said reinforcing sheet of tubular knit material extends between and is folded over said bead rings.

4. A tire according to claim 3 wherein said reinforcing sheet is folded so that the edges of said reinforcing sheet are adjacent said bead rings providing three layers of said reinforcing sheet between said bead portions.

5. A tire according to claim 2 wherein said sheet of tubular knit material is of single knit tubular construction.

6. A tire according to claim 5 wherein said cords of said sheet of tubular knit material are of a suitable textile polyester material.

7. A tire according to claim 1 wherein said sheet of tubular knit material is knit from substantially non-stretchable cords which have a sinuous configuration after the knitting operation and are straightened out in the stretched condition of said sheet.

8. A tire according to claim 1 wherein said reinforcing sheet is stretched up to 90 percent of the maximum elongation of said sheet.

9. A tire according to claim 1 wherein said reinforcing sheet is stretchable from a first diameter to a diameter generally twice the length of said first diameter.

10. A tire according to claim 1 wherein said sheet of tubular knit material is located at the radially inner surface portion of said tire.

11. A process for making a tire having an annular body of elastomeric material with a U-shaped cross section and an annular reinforcing sheet of tubular knit material with a plurality of openings comprising the steps of:
   (1) shaping said sheet from a generally cylindrical configuration to a generally toroidal configuration for positioning on a collapsible core;
   (2) placing said sheet and core within a mold and closing an outer shell of said mold around said core;
   (3) filling the cavity between said core and said outer shell by injecting a liquid reaction mixture of elastomer forming material and flowing said mixture through said openings in said knit material, reacting said mixture and at least partially curing said mixture;
   (4) opening said outer shell of said mold for removal of said tire and core from said mold;
   (5) finally curing said tire; and
   (6) removing said collapsible core from said tire.

12. The process of claim 11 wherein said sheet of tubular knit material is divided at two spaced positions from the edges of said sheet into a central portion between two end portions and folding said end portions over said central portion in overlapping relation.

13. The process of claim 12 wherein said spaced positions are substantially equally spaced across said sheet so that said end portions have substantially the same width as said central portion to provide three layers of reinforcing sheet material.

14. The process of claim 12 wherein said tire has a pair of bead rings including placing said bead rings over said sheet at said spaced positions and folding said end portions over said bead rings.

15. The process of claim 14 including placing said sheet of tubular knit material over a generally toroidal tire mold core, placing said bead rings and folding said end portions over said bead rings in overlapping relation with said central portion.

16. The process of claim 14 including placing said sheet of tubular knit material over a generally cylindrical tire building drum, placing said bead rings and folding said end portions over said bead rings in overlapping relation with said central portion.

17. The process of claim 16 including fastening the edges of said end portions to said sheet at said bead rings after folding said end portions over said bead rings in overlapping relation with said central portion.

* * * * *